US012320196B2

(12) United States Patent
Wang

(10) Patent No.: US 12,320,196 B2
(45) Date of Patent: Jun. 3, 2025

(54) ROLL-UP CONTROL DEVICE FOR ROLLER SHADE

(71) Applicant: Chih-Yung Wang, Taipei (TW)

(72) Inventor: Chih-Yung Wang, Taipei (TW)

( * ) Notice: Subject to any disclaimer, the term of this patent is extended or adjusted under 35 U.S.C. 154(b) by 302 days.

(21) Appl. No.: 17/963,385

(22) Filed: Oct. 11, 2022

(65) Prior Publication Data

US 2024/0117674 A1 Apr. 11, 2024

(51) Int. Cl.
*E06B 9/78* (2006.01)
*E06B 9/42* (2006.01)
*E06B 9/90* (2006.01)

(52) U.S. Cl.
CPC .................. *E06B 9/78* (2013.01); *E06B 9/42* (2013.01); *E06B 9/90* (2013.01); *E06B 2009/785* (2013.01)

(58) Field of Classification Search
CPC ........ E06B 9/78; E06B 2009/785; E06B 9/42; E06B 9/90; E06B 9/80
See application file for complete search history.

(56) References Cited

U.S. PATENT DOCUMENTS

2014/0014279 A1* 1/2014 Defenbaugh ............. E06B 9/68 160/168.1 P
2019/0178030 A1* 6/2019 Brown, II ................. E06B 9/40

* cited by examiner

*Primary Examiner* — Beth A Stephan
(74) *Attorney, Agent, or Firm* — MUNCY, GEISSLER, OLDS & LOWE, P.C.

(57) ABSTRACT

A roll-up control device for a roller shade, comprising a turntable assembly comprising a turntable, a pull spring, an outer turntable, a shaft and a clutch; and a brake assembly comprising a brake shaft cover fastening the shaft rod, a brake spring sleeved on a side of the brake shaft cover, a compression spring expanded and compressed inside the brake shaft cover, a brake sleeve sleeved the side of the brake shaft cover and a shaft housing accommodating a damping ring and clamping the brake sleeve.

10 Claims, 12 Drawing Sheets

ROLL-UP CONTROL DEVICE FOR ROLLER SHADE

FIELD OF THE INVENTION

The invention relates to a roll-up control device, and more particularly to a roll-up control device for a roller shade.

BACKGROUND OF THE INVENTION

There are several types of curtain structures on the market, which are mainly installed on doors and windows at home to shade sunlight and decorate. According to the needs of different consumers, the pulling strip or cord 11 shown in FIG. 1 is conventionally used to control pull down and roll up of the curtain 1. The pulling strip or cord 11 of the curtain 1 is too long, and it is very dangerous for a child to wind the pulling strip or cord 11 around the neck when using or playing therewith. Thus, it is necessary to improve it.

SUMMARY OF THE INVENTION

The main object of the invention is to solve the problem that the pulling strip or cord of conventional curtains are too long, and a child winds the pulling strip or cord as a toy around the neck, which is very dangerous.

In order to achieve the object, the invention provides a roll-up control device for a roller shade, comprising:

a turntable assembly, comprising a turntable fixing an end of a cord and winding the cord 56, a pull spring inserted into a side of the turntable, an outer turntable sleeved on the turntable, a shaft rod inserted into the outer turntable, the pull spring and the turntable, and a clutch provided on the shaft rod, wherein the clutch is configured to rotate to move away from the turntable or to restore a relative position to the turntable, and an other end of the cord passes through the outer turntable, wherein the turntable comprises a first disc disposed opposite to a second disc, a rotation portion is coupled to one side of the first disc, and a clamping portion is disposed on one side of the second disc opposite to the rotation portion, wherein the rotation portion comprises a projection having a first shaft hole, and at least one guiding body projected from a side of the projection, the side of the projection is provided with at least one insertion hole corresponding to one side of the at least one guiding body, wherein the guiding body comprises a guiding slant and a protruding block, the guiding slant is inclined on the projection and comprises a lower side and a higher side, the protruding block projects from the higher side of the guiding slant, wherein the clamping portion comprises at least one clamping space formed at an outer side of a ring projection, a first chamber formed at an inner side of the ring projection, and a second chamber formed adjacent to a side of the first chamber and communicating with the at least one insertion hole, the first chamber comprises a plurality of abutments, wherein the pull spring is inserted into the second chamber, an end of the pull spring is inserted into the insertion hole, and an other end is positioned between each of the abutments, wherein the outer turntable comprises an accommodating space formed at one side of the outer turntable and into which the turntable is inserted, and a exiting portion formed at an outer periphery of the outer turntable and communicating with the accommodating space, wherein the shaft rod comprises a convex cover covering the outer turntable, a fixing post protruding from a side of the convex cover, and a rod portion protruding from one side of the fixing post, at least one set of blocking bodies is provided on an other side of the convex cover opposite to the fixing post, one of the set of blocking bodies allows the other end of the pull spring to be inserted and locked, wherein the rod portion comprises a first rod penetrating into the pull spring, a second rod penetrating into the first shaft hole of the projection, and a third rod penetrating out of the rotation portion formed from the side of the convex cover, and wherein the clutch comprises a second shaft hole and at least one push rod portion, the third rod passes through the second shaft hole, the at least one push rod portion is provided at an outer periphery of a side of the clutch and is rotated by the turntable and is pushed by the guiding slant of the rotation portion; and a brake assembly, comprising a brake shaft cover allowing the shaft rod to be inserted and snapped, a brake spring sleeved on a side of the brake shaft cover, a compression spring expanded and compressed in the brake shaft cover, a brake sleeve sleeved the side of the brake shaft cover and allowing the compression spring to expand and compress inside, and a shaft housing tightly engaged with the turntable through a damping ring and inserted within the brake sleeve to be engaged in rotation or disengaged from clamping, wherein the brake shaft cover comprises a convex cover wall comprising a first protruding shaft, and a convex joint portion connected to a face of the convex cover wall opposite to the first protruding shaft, and a second protruding shaft protruding from a third chamber formed in the convex joint portion, the convex cover wall is engaged with the third rod, the convex joint portion comprises a first opening, and the second protruding shaft is inserted into the third rod, wherein the convex joint portion comprises a first projection and a second projection connected to one end of the first projection, the second projection is sleeved by the brake spring, one end of the compression spring is inserted into a bottom of the third chamber, the compression spring extends and retracts inside the third chamber, the third rod of the shaft rod is penetrated between the compression spring and the second protruding shaft, wherein the brake sleeve comprises a fixed portion comprising a second opening and provided around an outer surface of the first projection, a convex rod protruding from one end of the fixed portion and comprising a third opening, and a plurality of first scarfing rods spaced around an outer periphery of the convex rod, each interval between the plurality of first scarfing rods provides a first scarfing groove, wherein an outer periphery of the fixed portion is provided with a channel and a fourth chamber located inside the fixed portion, one end of the brake spring penetrates and is engaged through the channel, the fourth chamber communicates with the second opening and the third opening, an other end of the compression spring is placed in a bottom of the fourth chamber and extends and retracts inside the fourth chamber, the fixed portion comprises a third shaft hole in communication with the second opening and the third opening, the third rod of the shaft rod penetrates the third shaft hole, a fifth chamber communicates with the third opening and the second opening, and the fifth chamber is provided in the protruding rod, wherein the shaft housing comprises a protruding portion and an outer shaft sleeve, the protruding portion is assembled at one end of the turntable assembly and comprises a fourth opening, the outer shaft sleeve protrudes from one end of the protruding portion and is covered by the convex cover wall, wherein the outer shaft sleeve comprises a sixth chamber and a plurality of second scarfing rods, the sixth chamber provides a fifth opening, the brake sleeve is placed into the sixth chamber, the plurality of second scarfing rods arranged at intervals in an inner periphery of the sixth chamber, each interval between the plurality of second scarfing rods forms a second scarfing groove into which the plurality of first scarfing rods are snapped;

wherein when the other end of the cord is pulled a short distance, the clutch is pushed to slide linearly towards the brake sleeve, the brake sleeve is disengaged from the shaft housing, so that a power of an end of the roller shade is able to drive the shaft housing to roll up the roller shade; and wherein when the other end of the cord is unheld, the compression spring is repositioned and pushes the brake sleeve back into the shaft housing, and the brake spring brakes to control positioning of the roller shade after rolling up.

Furthermore, a connecting body has an outer diameter smaller than outer diameters of the first disc and the second disc, the connecting body is connected between the first disc and the second disc, a space is formed between the connecting body, the first disc and the second disc, and the connecting body provides a hole connecting the space, wherein an inner diameter of the second chamber is smaller than an inner diameter of the first chamber, two clamping spaces are separately provided at two sides of the hole, each of the clamping spaces provides a channel communicating with the hole, the end of the cord is a binding end and is inserted into and fixed in one of the clamping spaces, and the other end of the cord passes through the channel and the hole and is wound around the space, with three insertion holes and three abutments provided.

Furthermore, the outer turntable further comprises a convex pressing portion protruding from inside of the accommodating space and inserted into the first chamber, and a receiving region opposite to one end of the convex pressing portion and comprising a through hole, the receiving region is covered by the convex cover, the exiting portion is perforated, and each of the set of blocking bodies is provided with two projections, a clamping groove is provided between the two projections and penetrates the outer periphery of the convex cover, the clamping groove allows the other end of the pull spring to be inserted and locked, the third rod comprises an inner sleeve hole, at least one stick and two clamping bodies the second protruding shaft is inserted in the inner sleeve hole, the at least one stick connects the second rod at the outer periphery of the third rod, the two clamping bodies protrudes outwards at a terminal of the third rod, wherein an inner periphery of the second shaft hole of the clutch is provided with at least one groove accommodating the stick of the third rod, the push rod portion is convex and protrudes from one side of the clutch, and a rotation space into which the guiding body of the rotation portion is inserted is formed between the push rod portion and an outer periphery of one side of the clutch.

Furthermore, three sets of blocking bodies are provided, the fixing post is a square prism, outer diameters of the first rod, the second rod and the third rod of the rod portion are sequentially smaller, three sticks of the third rod are provided, three grooves of the clutch are provided according to the three sticks, and the push rod portion provides three convex strips distributed with respect to each sticks.

Furthermore, a bottom of the fourth chamber of the fixed portion is provided with an inner frame, the second projection of the convex joint portion abuts the inner frame, a first abutment is formed inside the protruding portion, the damping ring abuts between the first abutment and the rotation portion to fix tightly, the fifth opening of the outer shaft sleeve communicates with the fourth opening, and the outer shaft sleeve further comprises at least one limiting groove formed at an outer periphery of the outer shaft sleeve.

Furthermore, an outer diameter of the outer shaft sleeve is smaller than an outer diameter of the protruding portion.

Furthermore, the convex cover wall is provided with two embedding holes connecting the third chamber and fastened with the two clamping bodies of the third rod.

Furthermore, the first protruding shaft and the second protruding shaft are hexagonal, and the first protruding shaft is vertically provided with a pin hole passing through the first protruding shaft.

Furthermore, an outer diameter of the second projection is smaller than an outer diameter of the first projection.

Furthermore, the other end of the cord is attached with a block or an elongated bar.

Through the foregoing implementation of the invention, the following features are provided in comparison with the conventional technique.

According to the invention, when the roller shade is pulled down, the brake spring is loose, thus the brake spring can rotate at the periphery of the second projection and make the brake sleeve also rotate therewith, and then the shaft housing drives the brake sleeve to rotate together relative to the brake shaft cover. On the contrary, when the roller blind is rolled up, the brake spring becomes tightly stuck and does not rotate, and the brake sleeve and the shaft housing do not rotate also. The other end of the cord is driven by hand to a short distance, and the rotation portion at one side of the turntable is pulled to rotate and the guiding slant is brought into contact with the push rod portion of the clutch. The clutch is pushed to slide linearly in the direction of the brake sleeve and the compression spring is squeezed, and the push rod portion of the clutch is pushed out to stop with the protruding block without further pushing. The first scarfing rod of the brake sleeve and the second scarfing rod of the shaft housing are engaged with each other. A power from the other end of the roller shade can drive the shaft housing to rotate so as to roll up the curtain sheet of the roller shade. The other end of the cord is dropped off, and the elastic force of the compression spring recovers and pushes the first scarfing rod of the brake sleeve to engage with the second scarfing rod of the shaft housing, so that the brake spring brakes and the clutch is pushed back inwards to the original position with the rotation portion, and the rotation portion is assisted to return to the original position by the restoring elastic force of the pull spring so as to assist the positioning of the curtain sheet after rolling up.

DETAILED DESCRIPTION OF THE PREFERRED EMBODIMENTS

The detailed description and technical contents of the invention are described with reference to the drawings as follows.

Figure 1:
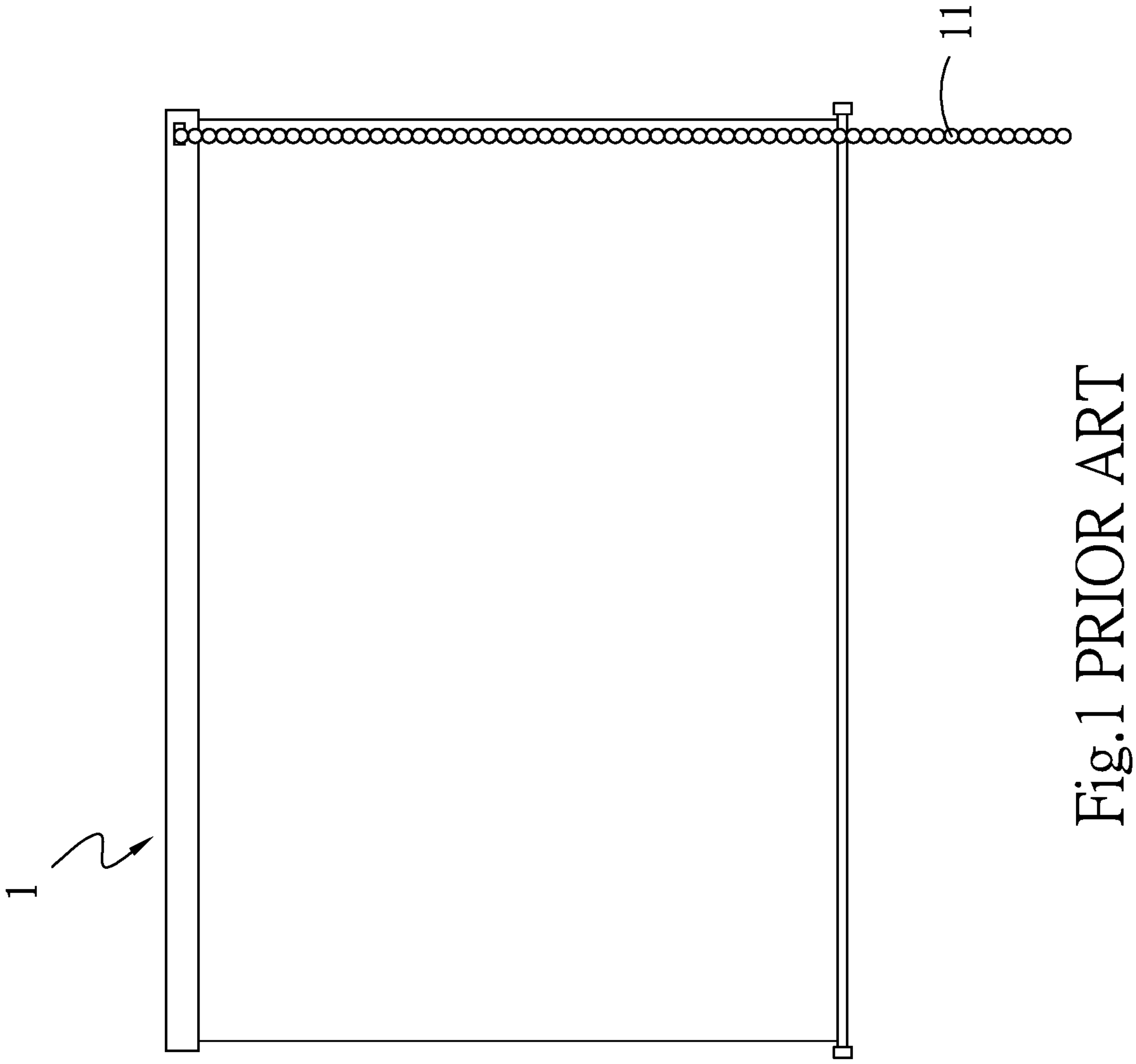
Fig.1 PRIOR ART
FIG. 1 is a schematic diagram of a conventional roller shade.
Figure 2:
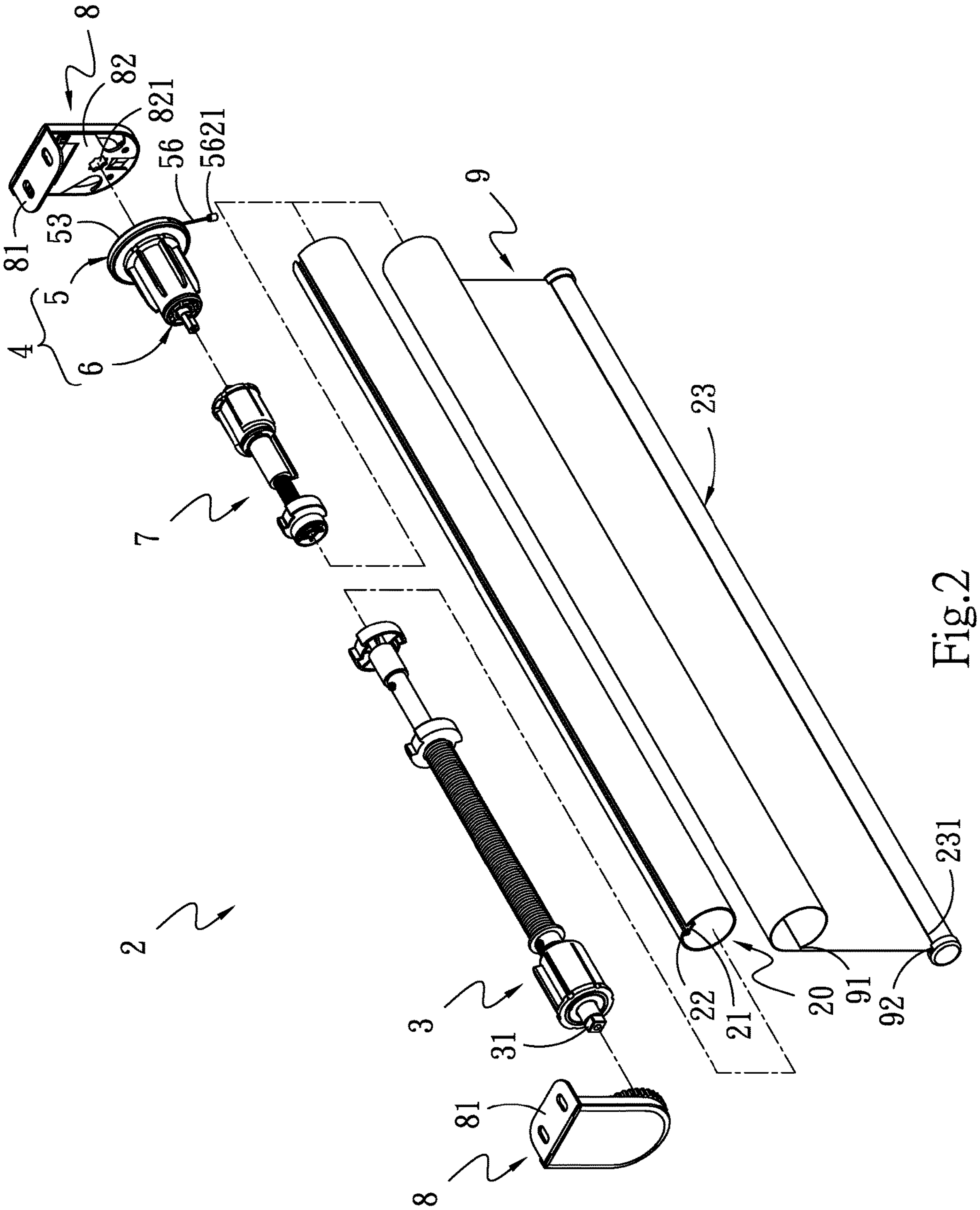
FIG. 2 is an exploded perspective view showing the arrangement of the roll-up control device for a roller shade according to the invention.
Figure 3:
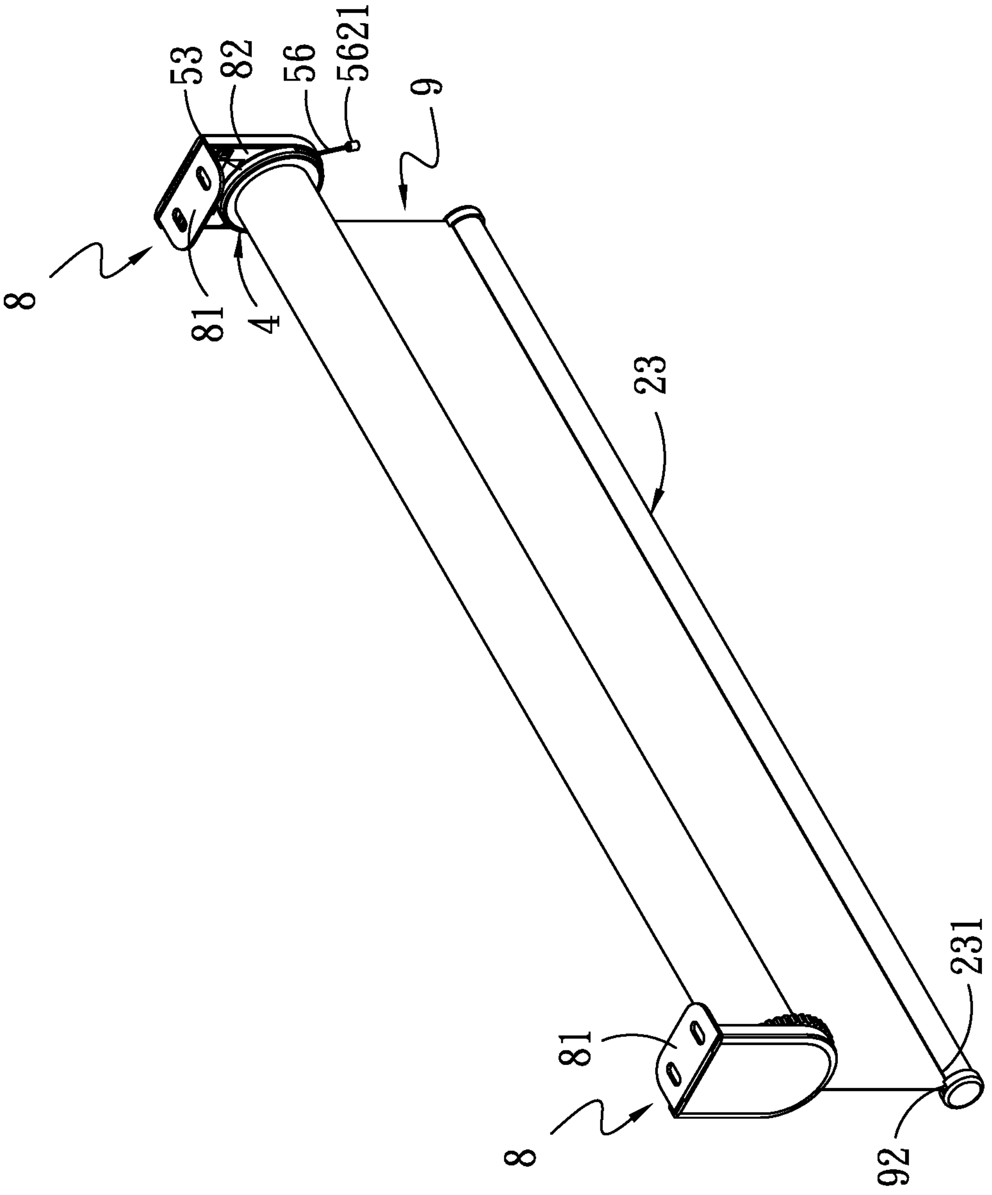
FIG. 3 is a perspective view of a configuration of the roll-up control device for a roller shade of FIG. 2.

With reference to FIG. 2 and FIG. 3, the invention provides a roll-up control device for a roller shade. A roller shade 2 comprises an upper rail 20, a roll-up device 3 mounted at one end of the upper rail 20 (the roll-up device 3 is a conventional member and will not be described in detail herein), a roll-up control device 4 mounted in one end of the upper rail 20 opposite to the roll-up device 3, a vertical positioning device 7 mounted in the upper rail 20 and connected to an end of the roll-up control device 4 (the vertical positioning device 7 is a conventional member and will not be described in detail herein), two fixing brackets 8 respectively coupled the roll-up device 3 and the roll-up control device 4 and provided on both sides above a window, a lower rail 23 separately provided below the upper rail 20, and a shade 9. The upper rail 20 is provided with a limiting projection 21 and an embedding groove 22. The limiting projection 21 is fixed with the roll-up device 3, the roll-up control device 4 and the vertical positioning device 7. The embedding groove 22 is provided above the limiting projection 21. The embedding groove 22 is used for embedding a starting end 91 of the shade 9 and winding the shade 9 on an outer surface of the upper rail 20, so that the shade 9 moves with the upper rail 20 to roll up and pull down. A channel 231 is provided on a surface of the lower rail 23 to fix a terminal end 92 of the shade 9. The vertical positioning device 7 is additionally installed on the roller shade 2. One end of the vertical positioning device 7 limits the lower rail 23 from descending beyond a lower limit position, or the vertical positioning device 7 limits the lower rail 23 from ascending above an upper limit position.

With reference to FIGS. 2, 4, 5, 6, 7, and 9, the roll-up control device 4 comprises a turntable assembly 5 and a brake assembly 6. The turntable assembly 5 comprises a turntable 51 fixing an end 561 of a cord 56 and winding the cord 56, a pull spring 52 inserted into a side of the turntable 51, an outer turntable 53 sleeved on the side of the turntable 51, a shaft rod 54 inserted into the outer turntable 53, the pull spring 52 and the turntable 51, and a clutch 55 provided on the shaft rod 54. The clutch 55 rotates to separate with the turntable 51 or to restore position of the turntable 51. An other end 562 of the cord 56 passes through the outer turntable 53. The turntable 51 includes a first disc 511 disposed opposite to a second disc 512, a rotation portion 513 coupled to one side of the first disc 511, and a clamping portion 514 disposed on one side of the second disc 512 opposite to the rotation portion 513. A connecting body 515 is connected between the first disc 511 and the second disc 512. The connecting body 515 has an outer diameter smaller than diameters of the first disc 511 and the second disc 512. A space 516 is formed between the connecting body 515, the first disc 511 and the second disc 512. A hole 517 connecting the space 516 is formed on the connecting body 515. The rotation portion 513 includes a projection 5131 having a first shaft hole 5133, and at least one guiding body 5132 projected from a side of the projection 5131. The side of the projection 5131 is provided with at least one insertion hole 5134 corresponding to one side of the at least one guiding body 5132. The at least one guiding body 5132 includes a guiding slant 5135 and a protruding block 5136. The guiding slant 5135 is inclined on the projection 5131 and includes a lower side and a higher side. The protruding block 5136 projected from the higher side of the guiding slant 5135. In this embodiment, three guiding bodies 5132 are provided and are triangular, and three insertion holes 5134 are provided. The clamping portion 514 includes at least one clamping space 5142 formed at an outer side of a ring projection 5141, a first chamber 5145 formed at an inner side of the ring projection 5141, and a second chamber 5146 formed adjacent to a side of the first chamber 5145 and communicating with the at least one insertion hole 5134. The first chamber 5145 includes a plurality of abutments 5143. The inner diameter of the second chamber 5146 is smaller than the inner diameter of the first chamber 5145. In one embodiment, each of the abutments 5143 is provided for each of the insertion holes 5134 and two clamping spaces 5142 are separately provided at two sides of the hole 517. Each of the clamping spaces 5142 provides a channel 5144 communicating with the hole 517. The end 561 of the cord 56 is a binding end and is inserted into and fixed in one of the clamping spaces 5142. The other end 562 of the cord 56 passes through the channel 5144 and the hole 517 and is wound around the space 516.

The pull spring 52 is inserted into the second chamber 5146, an end 521 of the pull spring 52 is inserted into the insertion hole 5134, and an other end 522 of the pull spring 52 is positioned between two of the abutments 5143.

Figure 12:
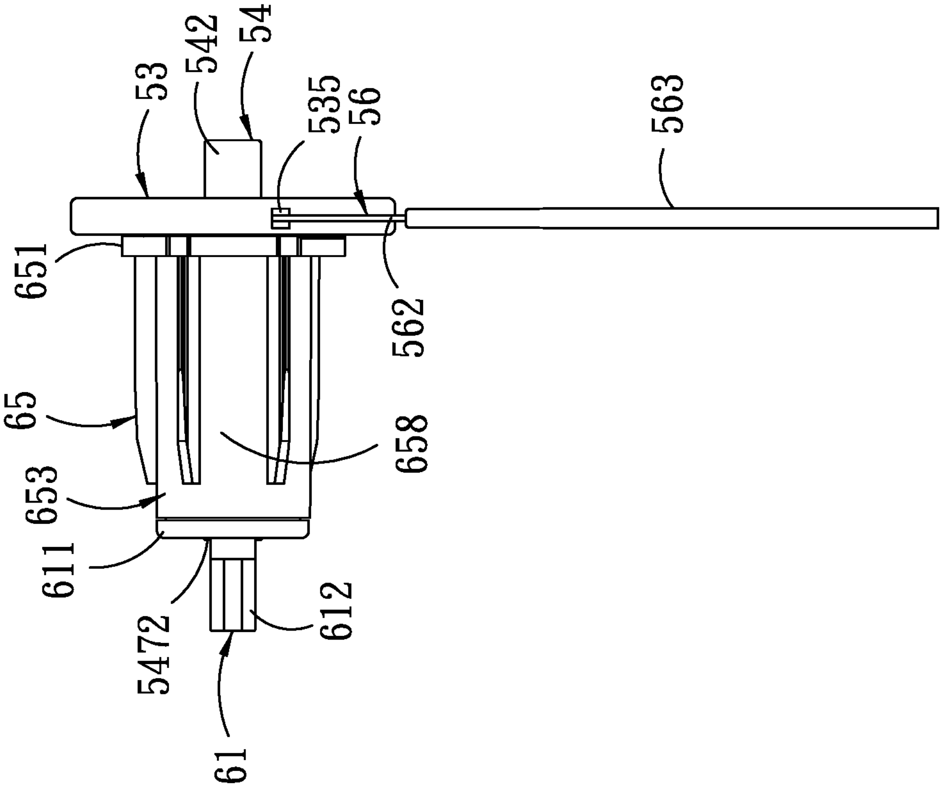
FIG. 12 is a front view of the cord, attached with a bar, of the roll-up control device of the invention.

The outer turntable 53 includes an accommodating space 531 formed at one side of the outer turntable 53 and into which the turntable 51 is inserted, a convex pressing portion 532 protruded from the inside of the accommodating space 531 and inserted into the first chamber 5145, a receiving region 533 opposite to one end of the convex pressing portion 532 and including a through hole 534, and an exiting portion 535 formed at the outer periphery of the outer turntable 53 and communicating with the accommodating space 531. The exiting portion 535 is perforated to allow the other end 562 of the cord 56 to exit. In more detail, before the other end 562 of the cord 56 is fixed, the length of the cord 56 can be adjusted according to the needed height, in order to avoid the risk of the cord 56 becoming too long and running around the neck. The other end 562 of the cord 56 is attached with a block 5621 or an elongated bar 563 as shown in FIG. 12, to bear against the outside of the exiting portion 535 and be held by the user's hand.

The shaft rod 54 includes a convex cover 541 that covers the placing region 533 of the outer turntable 53, a fixing post 542 that protrudes from a side of the convex cover 541, and a rod portion 543 that protrudes from one side of the fixing post 542. At least one set of blocking bodies 544 is provided on an other side of the convex cover 541 opposite to the fixing post 542. Each of the set of blocking bodies 544 is provided with two projections 5441, and a clamping groove 5442 provided between the two projections 5441 and penetrating the outer periphery of the convex cover 541. The clamping groove 5442 allows the other end 522 of the pull spring 52 to be inserted and locked. In one embodiment, three sets of blocking bodies 544 are provided. The fixing post 542 is a square prism. The rod portion 543 includes a first rod 545, a second rod 546, and a third rod 547 formed from the other side of the convex cover 541 and are sequentially smaller in outer diameter. The first rod 545 penetrates into the pull spring 52, the second rod 546 penetrates into the first shaft hole 5133 of the projection 5131, the third rod 547 penetrates out of the rotation portion 513. The third rod 547 includes an inner sleeve hole 5470 and provides at least one stick 5471 connecting the second rod 546 at the outer periphery of the third rod 547 and provides two clamping bodies 5472 protruding outward at the terminal of the third rod 547. In this embodiment, three sticks 5471 are provided.

The clutch 55 includes a second shaft hole 551 and at least one push rod portion 552. The third rod 547 passes through the second shaft hole 551. The at least one push rod portion 552 is provided at an outer periphery of a side of the clutch 55. The at least one push rod portion 552 is rotated by the turntable 51 and pushed by the guiding slant 5135 of the rotation portion 513. The inner periphery of the second shaft hole 551 is provided with at least one groove 553 accommodating the sticks 5471 of the third rod 547. In one embodiment, three grooves 553 are provided according to three sticks 5471. The push rod portion 552 is convex and protrudes from one side of the clutch 55. A rotation space 554 into which the guiding body 5132 of the rotational portion 513 is inserted is formed between the push rod portion 552 and the outer periphery of one side of the clutch 55. The push rod portion 552 has three convex strips distributed with respect to each of the grooves 553.

Referring to FIGS. 2, 4, 5, 6, 7, and 8, the brake assembly 6 comprises a brake shaft cover 61 allowing the shaft rod 54 to be inserted and snapped, a brake spring 62 sleeved on the outer periphery of a side of the brake shaft cover 61, a compression spring 63 arranged in the side of the brake shaft cover 61, a brake sleeve 64 sleeved the side of the brake shaft cover 61 and allowed the compression spring 63 to expand and compress inside, and a shaft housing 65 tightly engaged with the rotation portion 513 through a damping ring 66. The shaft housing 65 is inserted with the brake sleeve 64 to be engaged in rotation or disengaged from clamping. The brake shaft cover 61 comprises a convex cover wall 611 including a first protruding shaft 612, a convex joint portion 613 connected to a face of the convex cover wall 611 opposite to the first protruding shaft 612, and a second protruding shaft 616 protruding from a third chamber 615 formed in the convex joint portion 613. The convex cover wall 611 is engaged with the third rod 547. The convex joint portion 613 includes a first opening 614. The second protruding shaft 616 is inserted into the third rod 547. The convex cover wall 611 is provided with two embedding holes 6111 connecting the third chamber 615. When the third rod 547 penetrates into the third chamber 615, the second protruding shaft 616 penetrates into the inner sleeve hole 5470 of the third rod 547, and the two clamping bodies 5472 of the third rod 547 are fastened with the two embedding holes 6111. In this embodiment, the first protruding shaft 612 and the second protruding shaft 616 are hexagonal, and the first protruding shaft 612 is vertically provided with a pin hole 6121 passing through the shaft hole of the first protruding shaft 612. A pin 617 passes through and fixes the vertical positioning device 7 and the pin hole 6121. The convex joint portion 613 includes a first projection 6131 and a second projection 6132 connected to one end of the first projection 6131. An outer diameter of the second projection 6132 is smaller than an outer diameter of the first projection 6131.

The brake spring 62 is sleeved around the outer periphery of the second projection 6132.

One end 631 of the compression spring 63 is inserted into a bottom of the third chamber 615. The compression spring 63 extends and retracts inside the third chamber 615. The third rod 547 of the shaft rod 54 is penetrated between the compression spring 63 and the second protruding shaft 616.

Referring to FIGS. 4, 5, 6, 7, and 8, the brake sleeve 64 includes a fixed portion 641 including a second opening 640 and provided around the outer surface of the first projection 6131, a convex rod 642 protruding from one end of the fixed portion 641 and including a third opening 643, and a plurality of first scarfing rods 644 spaced around the outer periphery of the convex rod 642. In one embodiment, eight first scarfing rods 644 are provided, and each interval between the plurality of first scarfing rods 644 is provided with a first scarfing groove 6441. The outer periphery of the fixed portion 641 is provided with a channel 645 through which one end 621 of the brake spring 62 penetrates and is engaged, and a fourth chamber 646 located inside the fixed portion 641 and communicating with the second opening 640 and the third opening 643. The bottom of the fourth chamber 646 is provided with an inner frame 647 and a third shaft hole 648. The second projection 6132 of the convex joint portion 613 abuts the inner frame 647, so that an other end 632 of the compression spring 63 is placed in the bottom of the fourth chamber 646 and extends and retracts inside the fourth chamber 646. The third shaft hole 648 is in communication with the second opening 640 and the third opening 643. The third rod 547 of the shaft rod 54 penetrates the third shaft hole 648. A fifth chamber 649 is provided in the convex rod 642 and communicates with the third opening 643 and the second opening 640.

Referring to FIGS. 4, 5, 6, 7, and 8, the shaft housing 65 comprises a protruding portion 651 and an outer shaft sleeve 653. The protruding portion 651 is assembled at one end of the turntable assembly 5 and includes a fourth opening 652. The outer shaft sleeve 653 protrudes from one end of the protruding portion 651 and have an outer diameter smaller than an outer diameter of the protruding portion 651 and is covered by the convex cover wall 611. A first abutment 654 is formed inside the protruding portion 651. The damping ring 66 abuts between the first abutment 654 and the rotation portion 513 to fix tightly. The outer shaft sleeve 653 comprises a sixth chamber 655 formed inside the first abutment 654, a plurality of second scarfing rods 656 arranged at intervals in the inner periphery of the sixth chamber 655 and engaged with the plurality of first scarfing rods 644, a fifth opening 657 formed at the terminal of the sixth chamber 655 and communicating with the fourth opening 652, and at least one limiting groove 658 formed at the outer periphery of the outer shaft sleeve 653 and corresponding to the limiting projection 21 of the upper rail 20. The limiting projection 21 of the roller shade 2 drives the shaft housing 65 as well as the brake sleeve 64 to rotate together relative to the brake shaft cover 61. In one embodiment, eight second scarfing rods 656 and eight first scarfing rods 644 are provided accordingly, and each interval between the eight second scarfing rods 656 forms a second scarfing groove 6561 into which the plurality of first scarfing rods 644 are inserted. The brake sleeve 64 is inserted into the sixth chamber 655. Each of the first scarfing rods 644 is inserted into the second scarfing grooves 6561, and each of the second scarfing rods 656 is inserted into the first scarfing groove 6441 to be engaged with each other. When the shade 9 is pulled down, the shaft housing 65 rotates together with the brake sleeve 64. When the shade 9 is rolled up, the shaft housing 65 is fixed by the brake sleeve 64 and does not rotate.

The damping ring 66 is placed at the outer periphery of the projection 5131 and forms a seal with the first abutment 654 of the shaft housing 65 to control the rotation resistance of the shade 9 and to reduce rubbing noise of the shade 9.

Figure 4:
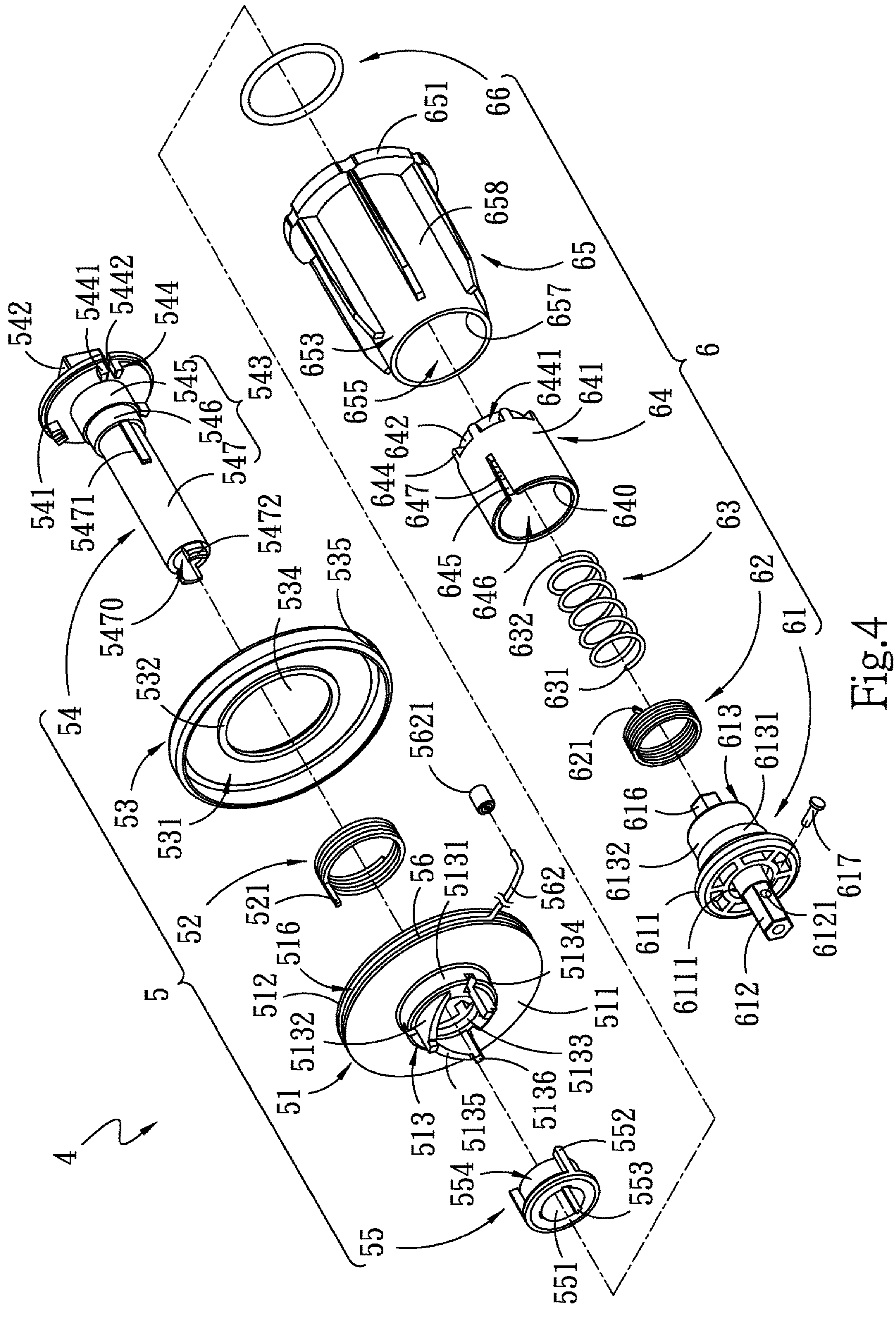
FIG. 4 is an exploded perspective view of the roll-up control device of the invention.
Figure 5:
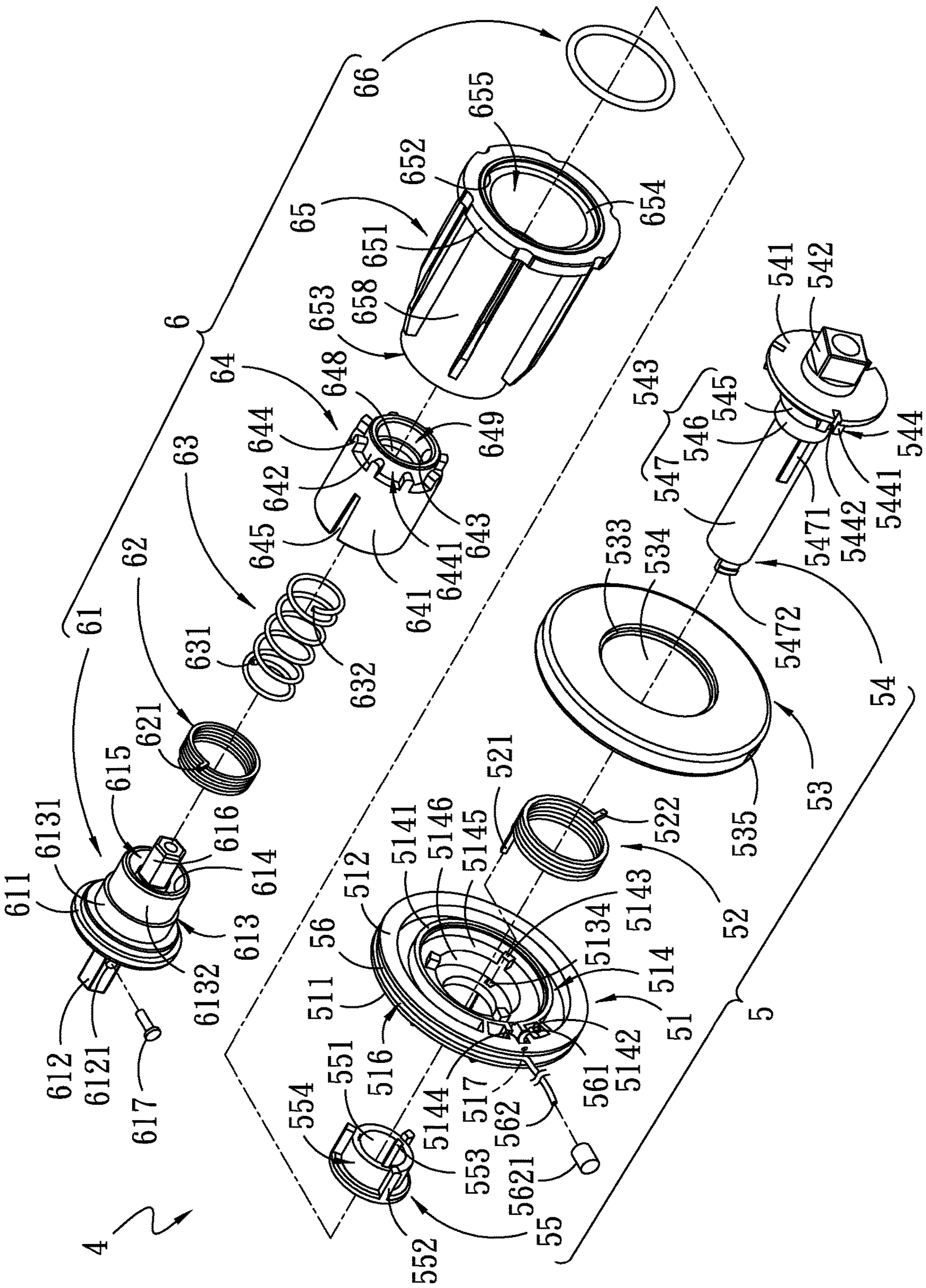
FIG. 5 is an exploded perspective view of another angle of the roll-up control of FIG. 4.
Figure 6:
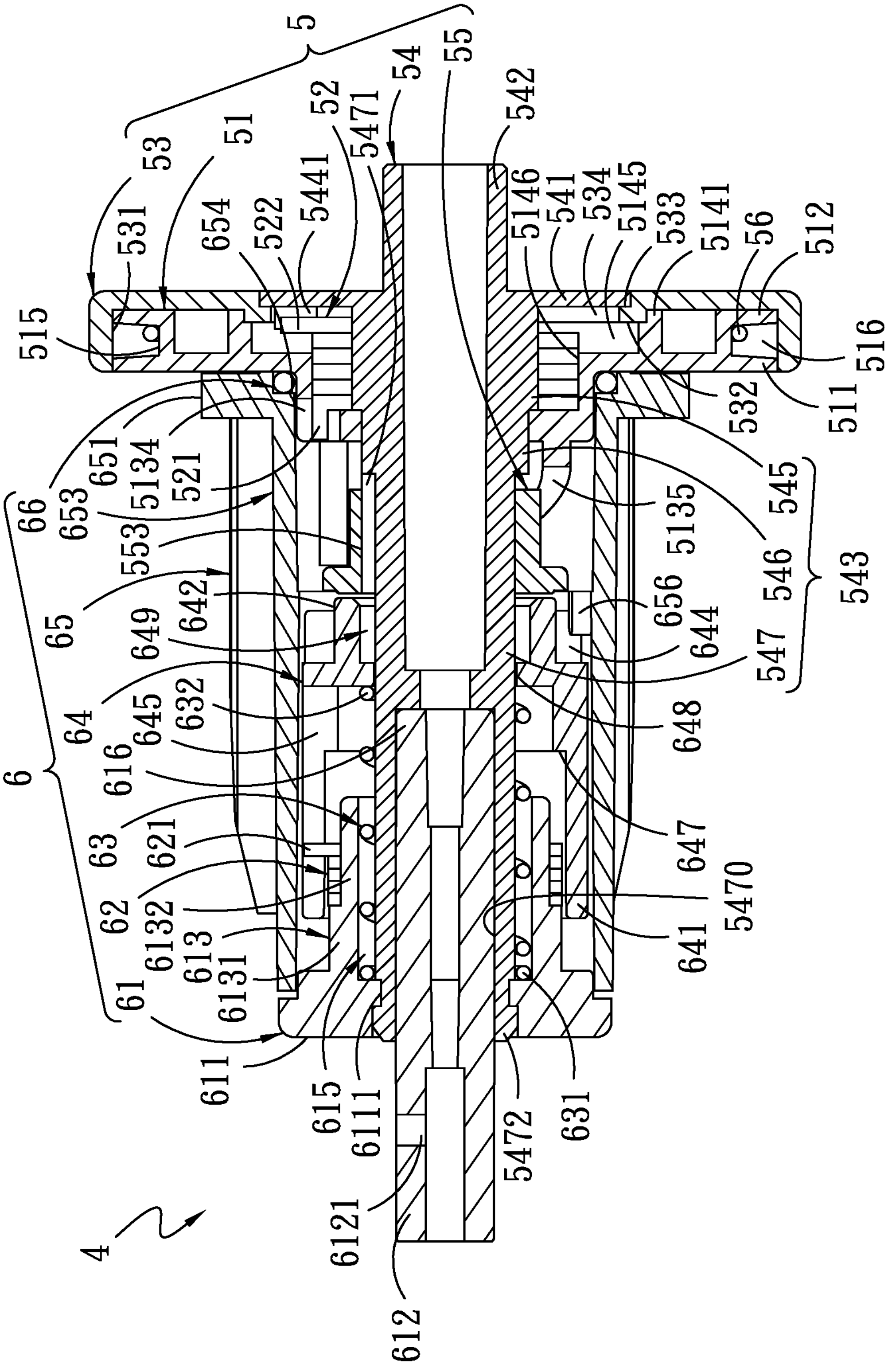
FIG. 6 is a cross-sectional side view of the roll-up control device of FIG. 4.
Figure 7:
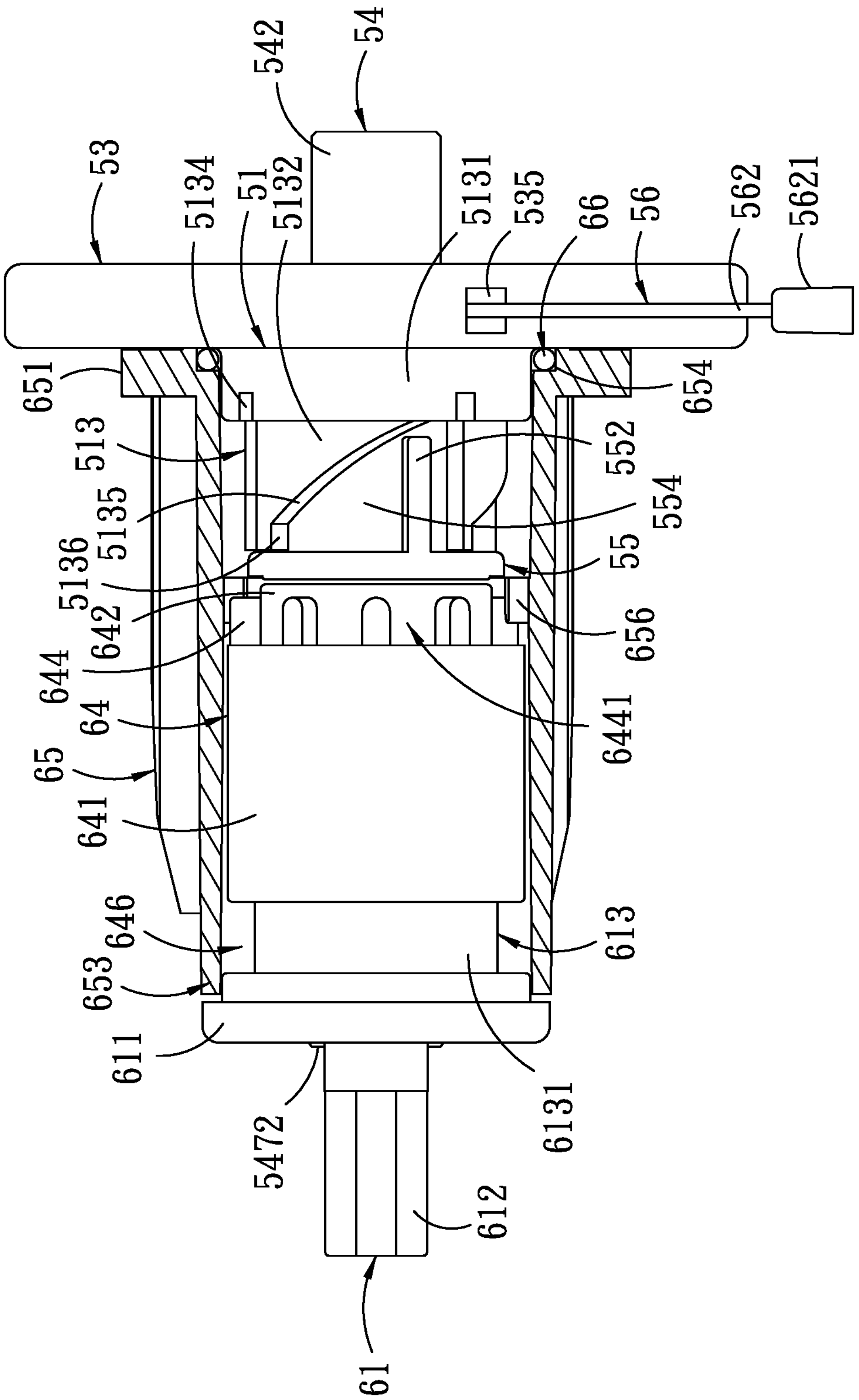
FIG. 7 is a front view showing the engagement of the shaft housing with the brake sleeve when the roller shade is pulled down according to the invention.
Figure 8:
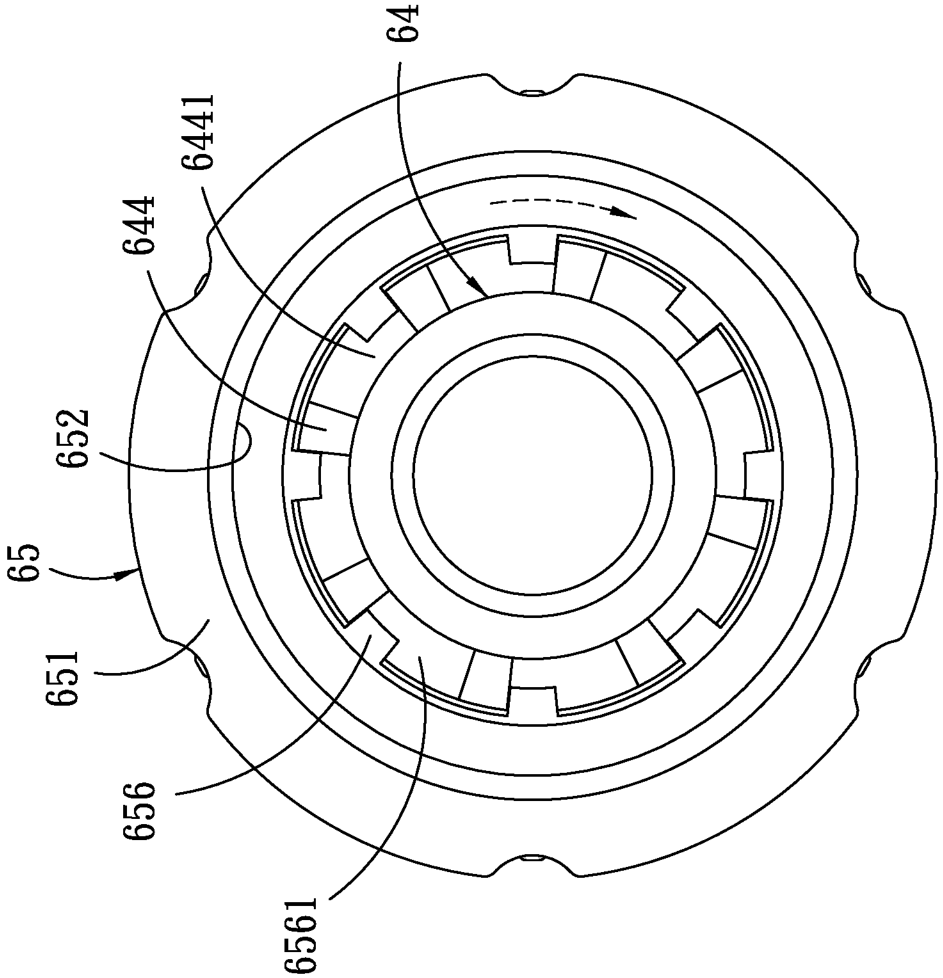
FIG. 8 is a schematic diagram of the rotation of the shaft housing engaged with the brake housing of FIG. 7.
Figure 9:
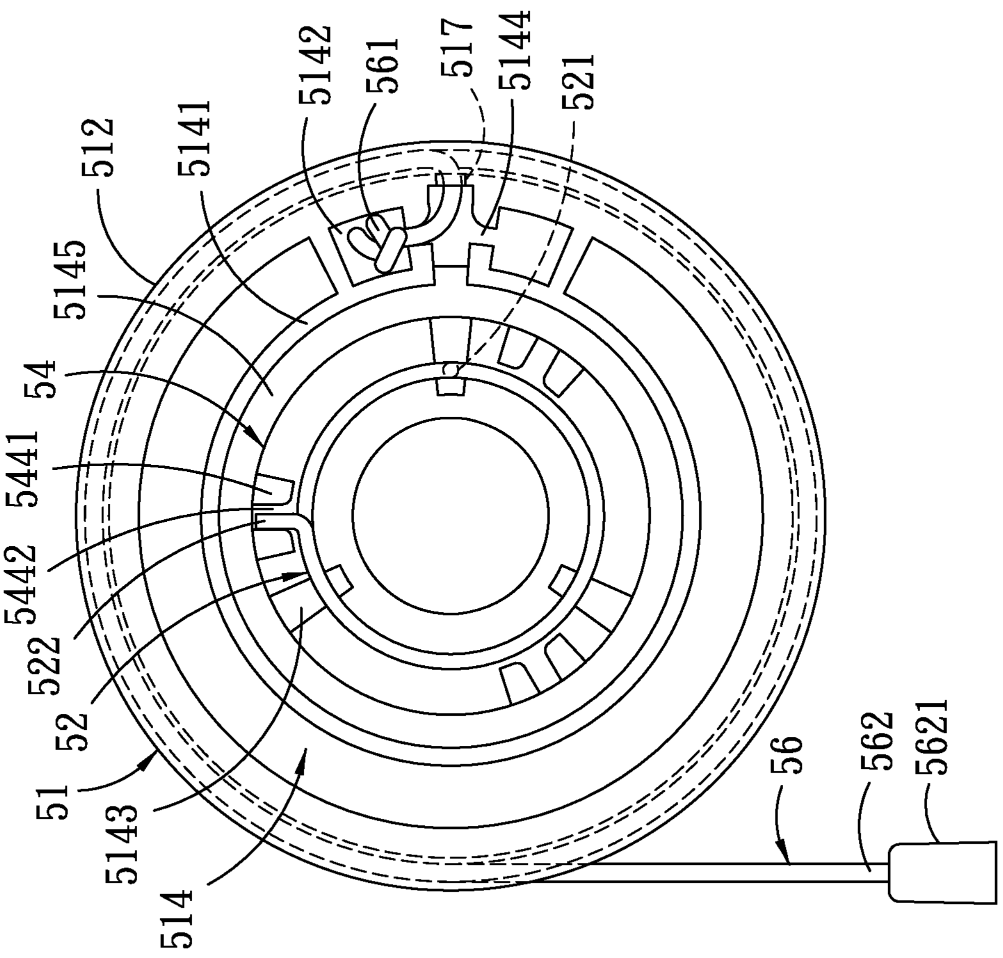
FIG. 9 is a side view of the pull spring, turn table and cord of the invention.
Figure 10:
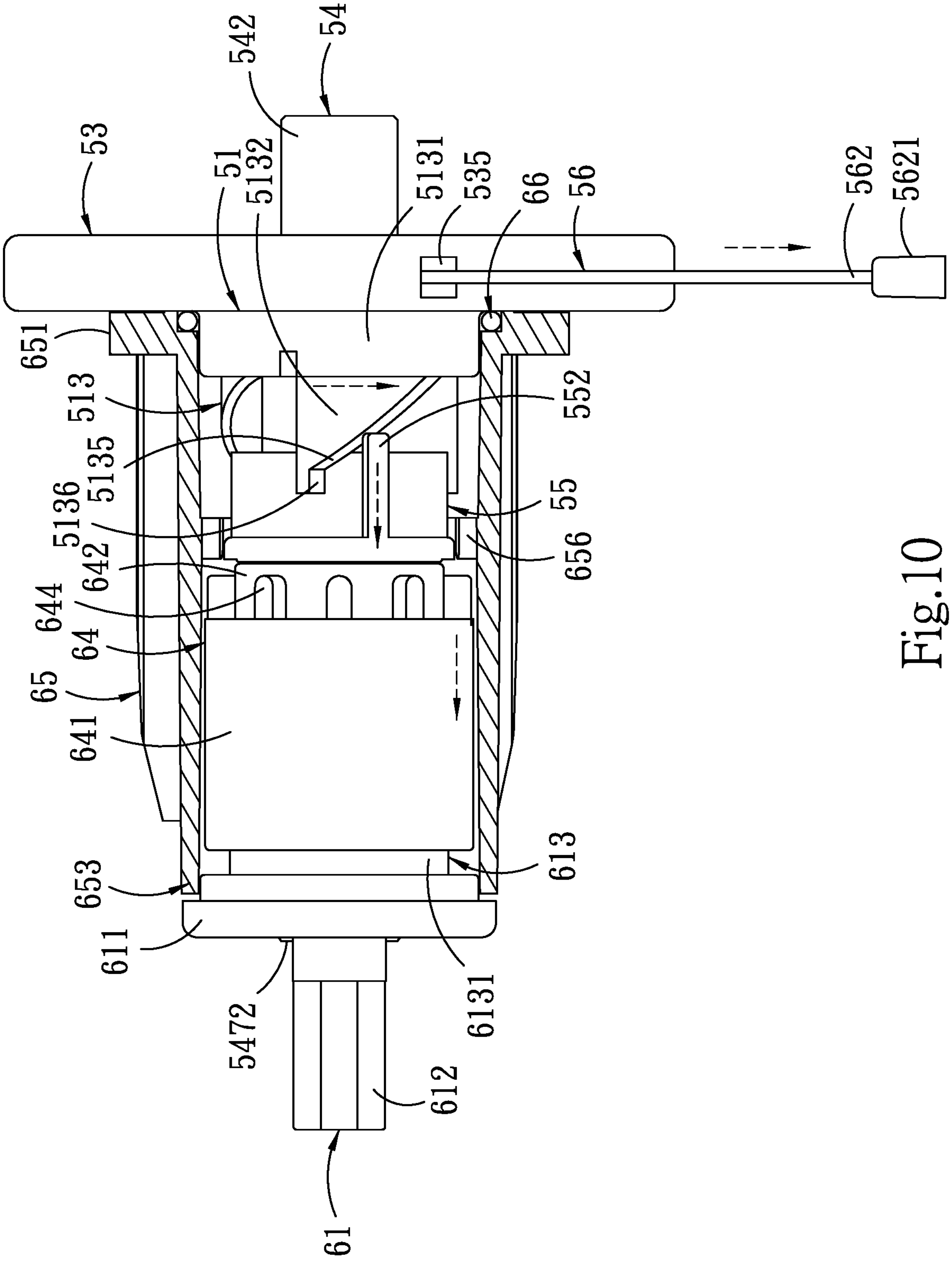
FIG. 10 is a schematic view of the push rod portion of the invention pushing and sliding the clutch linearly when the roller shade is rolled.
Figure 11:
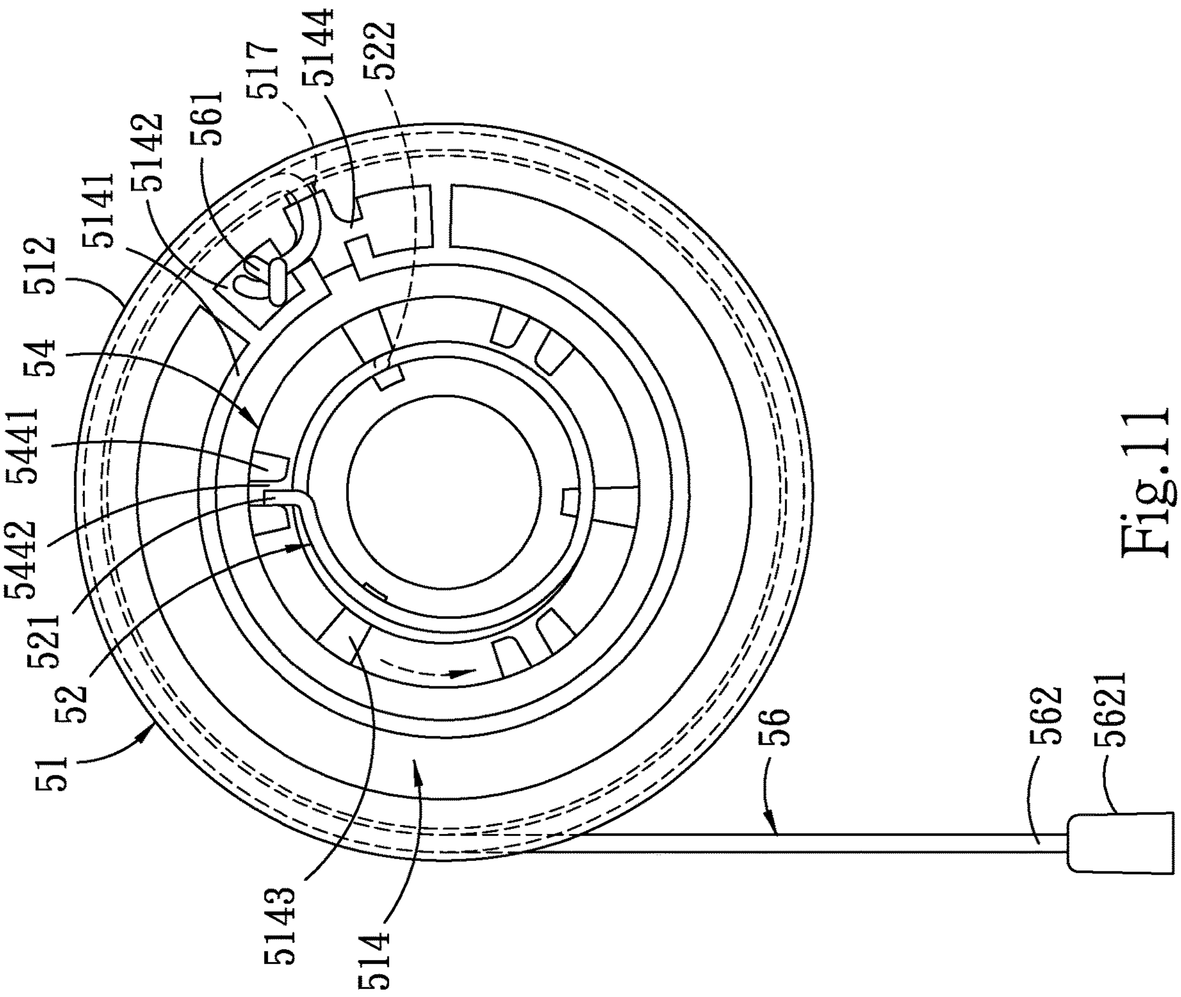
FIG. 11 is a schematic view of the pull spring of FIG. 10 being twisted.

Referring to FIGS. 2, 3, and 4, the two fixing brackets 8 are fixed on both sides above the window. Each of the two fixing brackets 8 includes a fixing body 81 and a stand 82 connected below the fixing body 81. Each of the stands 82 is provided with a through hole 821 through which a square column 31 of the roll-up device 3 and the fixing post 542 at an other end of the roll-up control device 4 are respectively inserted.

With reference to FIGS. 2, 3, 4, and 6, when the roller shade 2 is assembled, the shade 9 is arranged between the upper rail 20 and the lower rail 23, the roll-up control device 4, the vertical positioning device 7 and the roll-up device 3 are arranged in the upper rail 20, and the roll-up device 3 and the vertical positioning device 7 are driven to idle by the upper rail 20, so that the square column 31 at one end of the roll-up device 3 is axially connected to one of the two fixing brackets 8 at the left end, and the fixing post 542 at the other end of the roll-up control device 4 is axially connected to and extends out of one of the two fixing brackets 8 at the right end, so as to assemble the roller shade 2.

With reference to FIGS. 2, 4, 5, 6, 7, 8, 9, 10, and 11, when a user wants to pull down the shade 9 of the roller shade 2, as long as the lower rail 23 is pulled by hand, the upper rail 20 drives the roll-up device 3, the vertical limiting devices 7 and the shaft housing 65 of the roll-up control device 4 to rotate along the limiting projection 21, so that the plurality of second scarfing rods 656 of the shaft housing 65 engages with the plurality of first scarfing rods 644 of the brake sleeve 64. At this time, the brake spring 62 loosens, enabling the brake spring 62 to rotate at the outer periphery of the second projection 6132 and also enabling the brake sleeve 64 to rotate, and the shaft housing 65 is disposed to drive the brake sleeve 64 to rotate together relative to the brake shaft cover 61. After the roller shade 2 is unheld at a predetermined position, the shade 9 is pulled down to a predetermined position, the brake spring 62 is tightened and does not to rotate, the brake sleeve 64 and the shaft housing 65 do not rotate, the shaft rod 54 is fixed, and the shade 9 is stopped at the predetermined position. When rolling up the shade 9 of the roller shade 2, the other end 562 of the cord 56 is pulled a short distance by a user, the other end 522 of the pull spring 52 is placed into the clamping groove 5442 of the two projections 5441 to limit the position, the one end 521 of the pull spring 52 is inserted into the insertion hole 5134, the cord 56 is pulled to rotate the turntable 51, the pull spring 52 is twisted, and the guiding slant 5135 is brought into contact with the push rod portion 552 of the clutch 55, so as to push the clutch 55 to slide linearly towards the brake sleeve 64 and press the compression spring 63 until the push rod portion 552 of the clutch 55 is stopped by the convex block 5136, so that the plurality of first scarfing rods 644 of the brake sleeve 64 are disengaged from the plurality of second scarfing rods 656 of the shaft housing 65, such that the shaft housing 65 can freely rotate relative to the brake sleeve 64. The shaft housing 65 is rotated by a power provided by the rolling-up device 3 on an end of the roller shade 2, so as to roll up the shade 9 of the roller shade 2. When the other end 562 of the cord 56 is unheld, the elastic force of the compression spring 63 is restored and pushes the plurality of first scarfing rods 644 of the brake sleeve 64 back to the plurality of second scarfing rods 656 of the shaft housing 65, so that the brake spring 62 brakes, the clutch 55 is pushed back to an original position in respect with the rotation portion 513, and the rotation portion 513 returns to an original position by the restoring elastic force of the pull spring 52 so as to control the positioning of the shade 9 after rolling.

What is claimed is:

1. A roll-up control device for a roller shade, comprising: a turntable assembly, comprising a turntable fixing an end of a cord and winding the cord, a pull spring inserted into a side of the turntable, an outer turntable sleeved on the turntable, a shaft rod inserted into the outer turntable, the pull spring and the turntable, and a clutch provided on the shaft rod, wherein the clutch is configured to rotate to move away from the turntable or to restore a relative position to the turntable, and an other end of the cord passes through the outer turntable, wherein the turntable comprises a first disc disposed opposite to a second disc, a rotation portion is coupled to one side of the first disc, and a clamping portion is disposed on one side of the second disc opposite to the rotation portion, wherein the rotation portion comprises a projection having a first shaft hole, and at least one guiding body projected from a side of the projection, the side of the projection is provided with at least one insertion hole corresponding to one side of the at least one guiding body, wherein the at least one guiding body comprises a guiding slant and a protruding block, the guiding slant is inclined on the projection and comprises a lower side and a higher side, the protruding block projects from the higher side of the guiding slant, wherein the clamping portion comprises at least one clamping space formed at an outer side of a ring projection, a first chamber formed at an inner side of the ring projection, and a second chamber formed adjacent to a side of the first chamber and communicating with the at least one insertion hole, the first chamber comprises a plurality of abutments, wherein the pull spring is inserted into the second chamber, an end of the pull spring is inserted into the at least one insertion hole, and an other end is positioned between each of the abutments, wherein the outer turntable comprises an accommodating space formed at one side of the outer turntable and into which the turntable is inserted, and a exiting portion formed at an outer periphery of the outer turntable and communicating with the accommodating space, wherein the shaft rod comprises a convex cover covering the outer turntable, a fixing post protruding from a side of the convex cover, and a rod portion protruding from one side of the fixing post, at least one set of blocking bodies is provided on an other side of the convex cover opposite to the fixing post, one of the set of blocking bodies allows the other end of the pull spring to be inserted and locked, wherein the rod portion comprises a first rod penetrating into the pull spring, a second rod penetrating into the first shaft hole of the projection, and a third rod penetrating out of the rotation portion formed from the side of the convex cover, and wherein the clutch comprises a second shaft hole and at least one push rod portion, the third rod passes through the second shaft hole, the at least one push rod portion is provided at an outer periphery of a side of the clutch and is rotated by the turntable and is pushed by the guiding slant of the rotation portion; and a brake assembly, comprising a brake shaft cover allowing the shaft rod to be inserted and snapped, a brake spring sleeved on a side of the brake shaft cover, a compression spring expanded and compressed in the brake shaft cover, a brake sleeve sleeved the side of the brake shaft cover and allowing the compression spring to expand and compress inside, and a shaft housing tightly engaged with the turntable through a damping ring and inserted within the brake sleeve to be engaged in rotation or disengaged from clamping, wherein the brake shaft cover comprises a convex cover wall comprising a first protruding shaft, and a convex joint portion connected to a face of the convex cover wall opposite to the first protruding shaft, and a second protruding shaft protruding from a third chamber formed in the convex joint portion, the convex cover wall is engaged with the third rod, the convex joint portion comprises a first opening, and the second protruding shaft is inserted into the third rod, wherein the convex joint portion comprises a first projection and a second projection connected to one end of the first projection, the second projection is sleeved by the brake spring, one end of the compression spring is inserted into a bottom of the third chamber, the compression spring extends and retracts inside the third chamber, the third rod of the shaft rod is penetrated between the compression spring and the second protruding shaft, wherein the brake sleeve comprises a fixed portion comprising a second opening and provided around an outer surface of the first projection, a convex rod protruding from one end of the fixed portion and comprising a third opening, and a plurality of first scarfing rods spaced around an outer periphery of the convex rod, each interval between the plurality of first scarfing rods provides a first scarfing groove, wherein an outer periphery of the fixed portion is provided with a channel and a fourth chamber located inside the fixed portion, one end of the brake spring penetrates and is engaged through the channel, the fourth chamber communicates with the second opening and the third opening, an other end of the compression spring is placed in a bottom of the fourth chamber and extends and retracts inside the fourth chamber, the fixed portion comprises a third shaft hole in communication with the second opening and the third opening, the third rod of the shaft rod penetrates the third shaft hole, a fifth chamber communicates with the third opening and the second opening, and the fifth chamber is provided in the convex rod, wherein the shaft housing comprises a protruding portion and an outer shaft sleeve, the protruding portion is assembled at one end of the turntable assembly and comprises a fourth opening, the outer shaft sleeve protrudes from one end of the protruding portion and is covered by the convex cover wall, wherein the outer shaft sleeve comprises a sixth chamber and a plurality of second scarfing rods, the sixth chamber provides a fifth opening, the brake sleeve is placed into the sixth chamber, the plurality of second scarfing rods arranged at intervals in an inner periphery of the sixth chamber, each interval between the plurality of second scarfing rods forms a second scarfing groove into which the plurality of first scarfing rods are snapped;

wherein when the other end of the cord is pulled a short distance, the clutch is pushed to slide linearly towards the brake sleeve, the brake sleeve is disengaged from the shaft housing, so that a power of an end of the roller shade is able to drive the shaft housing to roll up the roller shade; and wherein when the other end of the cord is unheld, the compression spring is repositioned and pushes the brake sleeve back to engage with the shaft housing, and the brake spring brakes to control positioning of the roller shade after rolling up.

2. The roll-up control device for a roller shade according to claim 1, wherein a connecting body has an outer diameter smaller than outer diameters of the first disc and the second disc, the connecting body is connected between the first disc and the second disc, a space is formed between the connecting body, the first disc and the second disc, and the connecting body provides a hole connecting the space, wherein an inner diameter of the second chamber is smaller than an inner diameter of the first chamber, two clamping spaces are separately provided at two sides of the hole, each of the clamping spaces provides a channel communicating with the hole, the end of the cord is a binding end and is inserted into and fixed in one of the clamping spaces, and the other end of the cord passes through the channel and the hole and is wound around the space, with three insertion holes and three abutments provided.

3. The roll-up control device for a roller shade according to claim 1, wherein the outer turntable further comprises a convex pressing portion protruding from inside of the accommodating space and inserted into the first chamber, and a receiving region opposite to one end of the convex pressing portion and comprising a through hole, the receiving region is covered by the convex cover, the exiting portion is perforated, and each of the set of blocking bodies is provided with two projections, a clamping groove is provided between the two projections and penetrates the outer periphery of the convex cover, the clamping groove allows the other end of the pull spring to be inserted and locked, the third rod comprises an inner sleeve hole, at least one stick and two clamping bodies the second protruding shaft is inserted in the inner sleeve hole, the at least one stick connects the second rod at the outer periphery of the third rod, the two clamping bodies protrudes outwards at a terminal of the third rod, wherein an inner periphery of the second shaft hole of the clutch is provided with at least one groove accommodating the stick of the third rod, the at least one push rod portion is convex and protrudes from one side of the clutch, and a rotation space into which the at least one guiding body of the rotation portion is inserted is formed between the at least one push rod portion and an outer periphery of one side of the clutch.

4. The roll-up control device for a roller shade according to claim 3, wherein three sets of blocking bodies are provided, the fixing post is a square prism, outer diameters of the first rod, the second rod and the third rod of the rod portion are sequentially smaller, three sticks of the third rod are provided, three grooves of the clutch are provided according to the three sticks, and the at least one push rod portion provides three convex strips distributed with respect to each sticks.

5. The roll-up control device for a roller shade according to claim 3, wherein a bottom of the fourth chamber of the fixed portion is provided with an inner frame, the second projection of the convex joint portion abuts the inner frame, a first abutment is formed inside the protruding portion, the damping ring abuts between the first abutment and the rotation portion to fix tightly, the fifth opening of the outer shaft sleeve communicates with the fourth opening, and the outer shaft sleeve further comprises at least one limiting groove formed at an outer periphery of the outer shaft sleeve.

6. The roll-up control device for a roller shade according to claim 5, wherein an outer diameter of the outer shaft sleeve is smaller than an outer diameter of the protruding portion.

7. The roll-up control device for a roller shade according to claim 3, wherein the convex cover wall is provided with two embedding holes connecting the third chamber and fastened with the two clamping bodies of the third rod.

8. The roll-up control device for a roller shade according to claim 1, wherein the first protruding shaft and the second protruding shaft are hexagonal, and the first protruding shaft is vertically provided with a pin hole passing through the first protruding shaft.

9. The roll-up control device for a roller shade according to claim 1, wherein an outer diameter of the second projection is smaller than an outer diameter of the first projection.

10. The roll-up control device for a roller shade according to claim 1, wherein the other end of the cord is attached with a block or an elongated bar.

* * * * *